(12) United States Patent
Shitagami et al.

(10) Patent No.: US 8,503,066 B2
(45) Date of Patent: Aug. 6, 2013

(54) ELECTROPHORETIC DISPLAY DEVICE, METHOD OF MANUFACTURING THE SAME, AND ELECTRONIC APPARATUS

(75) Inventors: Kozo Shitagami, Chino (JP); Yasushi Yamazaki, Azumino (JP); Shinobu Yokokawa, Okaya (JP); Harunobu Komatsu, Matsumoto (JP); Atsushi Kitabayashi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 41 days.

(21) Appl. No.: 13/234,603

(22) Filed: Sep. 16, 2011

(65) Prior Publication Data

US 2012/0099181 A1 Apr. 26, 2012

(30) Foreign Application Priority Data

Oct. 20, 2010 (JP) ................................ 2010-235479

(51) Int. Cl.
*G02B 26/00* (2006.01)
(52) U.S. Cl.
USPC .......................................... 359/296; 359/290

(58) Field of Classification Search
USPC .......................................... 359/290, 295, 296
See application file for complete search history.

(56) References Cited

U.S. PATENT DOCUMENTS

2007/0188442 A1* 8/2007 Hattori et al. ................ 345/107

FOREIGN PATENT DOCUMENTS

| JP | A-2003-318214 | 11/2003 |
| JP | A-2004-326011 | 11/2004 |

* cited by examiner

*Primary Examiner* — Mahidere Sahle
(74) *Attorney, Agent, or Firm* — Oliff & Berridge, PLC

(57) ABSTRACT

An electrophoretic display device includes: a substrate; partition walls which partition a space on the substrate into a plurality of cells; an electrophoretic dispersion liquid with which the plurality of cells on the substrate is filled; a sealing film which is disposed so as to face the substrate with the partition walls interposed therebetween and seals the plurality of cells; and phase separation portions which are partially formed between upper surfaces of the partition walls and the sealing film and in which the electrophoretic dispersion liquid is subjected to phase separation.

5 Claims, 6 Drawing Sheets

O2 PLASMA TREATMENT

ELECTROPHORETIC DISPLAY DEVICE, METHOD OF MANUFACTURING THE SAME, AND ELECTRONIC APPARATUS

BACKGROUND

1. Technical Field

The present invention relates to an electrophoretic display device, a method of manufacturing the same, and an electronic apparatus.

2. Related Art

There is known a kind of electrophoretic display device in which a space between a pair of substrates is partitioned into a plurality of cells by partition walls and the cells are filled with an electrophoretic dispersion liquid (for example, JP-A-2004-326011).

For example, JP-A-2004-326011 discloses a technique for adhering the partition walls formed on one substrate to the other substrate by the use of a transferring adhesive film.

In the above-described technique disclosed in JP-A-2004-326011, there is a concern that adhesiveness between the partition walls and the transferring adhesive film may deteriorate when the electrophoretic dispersion liquid exists on the partition walls in a manufacturing process. For this reason, a technical problem may arise in that the adhesiveness between the partition walls and the other substrate may deteriorate and thus an airtight property of the cells may degrade.

SUMMARY

An advantage of some aspects of the invention is that it provides an electrophoretic display device, a method of manufacturing the same, and an electronic apparatus including the electrophoretic display device capable of improving the airtight property of a plurality of cells filled with an electrophoretic dispersion liquid in a configuration in which a space on a substrate is partitioned by partition walls.

According to an aspect of the invention, there is provided an electrophoretic display device including: a substrate; partition walls which partition a space on the substrate into a plurality of cells; an electrophoretic dispersion liquid with which the plurality of cells on the substrate is filled; a sealing film which is disposed so as to face the substrate with the partition walls interposed therebetween and seals the plurality of cells; and phase separation portions which are partially formed between upper surfaces of the partition walls and the sealing film and in which the electrophoretic dispersion liquid is subjected to phase separation.

In the electrophoretic display device according to this aspect of the invention, the space on the substrate is partitioned into the plurality of cells by the partition walls. The plurality of cells is filled with the electrophoretic dispersion liquid in which a plurality of electrophoretic particles is dispersed in a dispersion medium which is, for example, a hydrocarbon-based solvent. The partition walls have a lattice planar shape on the substrate in a plan view. The partition walls are made of, for example, epoxy-based resin. The plurality of cells is sealed by the sealing film which faces the substrate with the partition walls interposed therebetween. The plurality of cells can be sealed by closely adhering the sealing film and the upper surfaces of the partition walls to each other. The sealing film is generally made of a material containing a water-soluble polymer such as polyvinyl alcohol (PVA).

In the manufacturing process, when the plurality of cells is filled with the electrophoretic dispersion liquid, there is a concern that the electrophoretic dispersion liquid remains on the upper surfaces of the partition walls and the remaining electrophoretic dispersion liquid is interposed between the upper surfaces of the partition walls and the sealing film. For this reason, when no countermeasure is performed, the electrophoretic dispersion liquid may be interposed between the upper surfaces of the partition walls and the sealing film and thus the adhesion between the upper surfaces of the partition walls and the sealing film may deteriorate.

According to the aspect of the invention, the phase separation portions in which the electrophoretic dispersion liquid is subjected to phase separation are partially formed between the upper surfaces of the partition walls and the sealing film. That is, according to the aspect of the invention, particularly, the electrophoretic dispersion liquid remaining on the upper surfaces of the partition walls is subjected to phase separation in the manufacturing process. Accordingly, the area in which the upper surfaces of the partition walls and the sealing film are closely adhered to each other can be made larger compared to a case where the electrophoretic dispersion liquid subjected to no phase separation is interposed, for example, between the upper surfaces of the partition walls and the sealing film. Accordingly, it is possible to improve the adhesion of the upper surfaces of the partition walls and the sealing film. Thus, it is possible to improve the airtight property of the plurality of cells. As a consequence, it is possible to improve reliability of the electrophoretic display device.

As described above, in the electrophoretic display device according to the aspect of the invention, it is possible to improve the adhesion of the upper surfaces of the partition walls and the sealing film. Thus, it is possible to improve the airtight property of the plurality of cells.

In the electrophoretic display device according to the aspect of the invention, at least one of the electrophoretic dispersion liquid and the sealing film may include an amphiphilic material.

According to the aspect of the invention, since at least one of the electrophoretic dispersion liquid and the sealing film contains an amphiphilic material with a hydrophilic group and an lipophilic group, the phase separation portions can be reliably formed between the upper surfaces of the partition walls and the sealing film. That is, in the manufacturing process, the electrophoretic dispersion liquid remaining on the upper surfaces of the partition walls can be reliably subjected to phase separation by the amphiphilic material contained in at least one of the upper surfaces of the partitions and the sealing film. Accordingly, it is possible to improve the adhesion of the upper surfaces of the partition walls and the sealing film.

In the electrophoretic display device according to the aspect of the invention, the upper surfaces of the partition walls may be subjected to polar surface treatment.

According to the aspect of the invention, a polar surface process such as oxygen (O2) plasma treatment or carbon tetrafluoride (CF4) plasma treatment is performed, so that a polar group such as carboxyl group (—COOH), a carbonyl group (—C(=O)—), or a carbon fluoride group (—CF) is formed on the upper surface of the partition wall. Accordingly, hydrogen bonding is formed between the polar group formed on the upper surface of the partition wall and a hydroxyl group (—OH) of the sealing film including, for example, polyvinyl alcohol. Thus, it is possible to more reliably improve the adhesion of the upper surfaces of the partition walls and the sealing film.

According to another aspect of the invention, there is provided a method of manufacturing an electrophoretic display device. The method includes: forming partition walls, which partition a space on the substrate into a plurality of cells, on a surface; filling the plurality of cells on the substrate with an electrophoretic dispersion liquid; performing polar surface treatment on upper surfaces of the partition walls; and preparing a sealing film, which seals the plurality of cells, so as to face the substrate with the partition walls interposed therebetween. At least one of the electrophoretic dispersion liquid and the sealing film includes an amphiphilic material. Phase separation portions, in which the electrophoretic dispersion liquid is subjected to phase separation, are partially formed between upper surfaces of the partition walls and the sealing film.

In the method of manufacturing the electrophoretic display device according to this aspect of the invention, the electrophoretic display device (including the various kinds of aspects) according to the above-described aspect of the invention can be manufactured. In particular, according to the aspect of the invention, since at least one of the electrophoretic dispersion liquid and the sealing film includes an amphiphilic material, the phase separation portions can be reliably formed between the upper surfaces of the partition walls and the sealing film. According to the aspect of the invention, by performing the polar surface process, the polar group such as a carboxyl group, a carbonyl group, or a carbon fluoride group is formed on the upper surface of the partition wall and the hydrogen bonding is formed between the polar group and the hydroxyl group of the sealing film. As a consequence, it is possible to reliably improve the adhesion of the upper surfaces of the partition walls and the sealing film.

According to still another aspect of the invention, there is provided an electronic apparatus including the electrophoretic display device (including the various kinds of aspects) described above.

Since the electronic apparatus according to this aspect of the invention includes the electrophoretic display device described above according to the invention, the electronic apparatus is realized as various types of electronic apparatuses, such as a wristwatch, an electronic paper, an electronic note, a portable telephone, or a portable audio apparatus, capable of performing displaying with high quality.

The operations and the other advantages of the invention are apparent from embodiments described below.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings.

First Embodiment

An electrophoretic display device according to a first embodiment will be described with reference to FIGS. 1 to 3.

First, the entire configuration of the electrophoretic display device according to this embodiment will be described with reference to FIG. 1.

Figure 1:
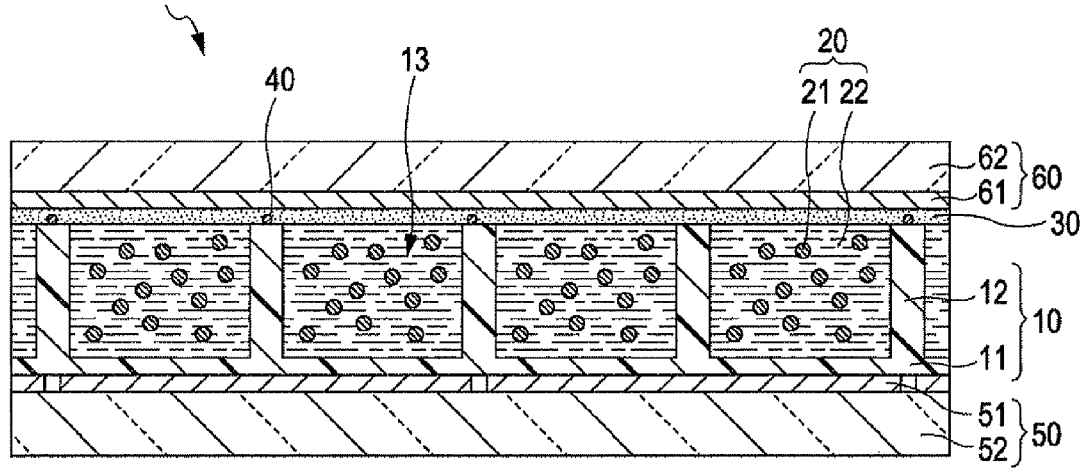
FIG. 1 is a sectional view illustrating the configuration of an electrophoretic display device according to a first embodiment.

FIG. 1 is a sectional view illustrating the configuration of the electrophoretic display device according to this embodiment.

In FIG. 1, an electrophoretic display device 1 according to this embodiment is an active matrix driving type electrophoretic display device that is capable of displaying an image in a display region by applying a voltage corresponding to an image signal to an electrophoretic dispersion liquid 20 disposed between a circuit substrate 50 and a counter substrate 60 facing each other.

The circuit substrate 50 includes a plate-shaped substrate 52 and a plurality of pixel electrodes 51 formed on one surface of the substrate 52. On the one surface or the other surface of the substrate 52, each of thin film transistors (TFTs) driving the pixel electrodes 51 is disposed in a display region for each of pixels arranged in, for example, a matrix form. More specifically, a laminated structure, where the TFTs driving the pixel electrodes 51 and wirings such as scanning lines and data lines are formed, is formed in the substrate 52. The substrate 52 is a glass substrate or a substrate (that is, a resin substrate) made of an insulation resin material such as a polycarbonate (PC) or a polyethylene terephthalate (PET). The pixel electrode 51 is made of a conductive material such as aluminum (Al).

The counter substrate 60 includes a plate-shaped substrate 62 and a counter electrode 61 formed on one surface of the substrate 62. As in the substrate 52 of the circuit substrate 50, the substrate 62 is a glass substrate or a substrate (that is, a resin substrate) made of an insulation resin material such as a polycarbonate or a polyethylene terephthalate. The counter electrode 61 is made of a conductive material, such as indium tin oxide (ITO), having light transmissive property.

The electrophoretic dispersion liquid 20 with which a plurality of cells 13 of a cell matrix 10 is filled is interposed between the circuit substrate 50 and the counter substrate 60.

The cell matrix 10 includes a plate-shaped substrate 11 and partition walls 12 disposed on one surface of the substrate 11. The substrate 11 is an example of a "substrate" according to the invention. A space on the substrate 11 is partitioned by the partition walls 12 to form the plurality of cells 13. For example, the partition walls 12 have a quadrate lattice planar shape on the substrate 11 in a plan view (see FIG. 2). The substrate 11 and the partition walls 12 are integrally formed. The cell matrix 10 (that is, the substrate 11 and the partition walls 12) is made of a resin material such as an epoxy-based resin, an acrylic-based resin, a urethane-based resin, a melamine-based resin, or a phenol-based resin.

The planar shape of the partition walls 12 is not limited to the quadrate lattice shape, but may be, for example, a honeycomb lattice shape or a triangular lattice shape. In this embodiment, the case where the partition walls 12 and the substrate 11 are integrally formed has been exemplified. However, the partition walls 12 and the substrate 11 may be separately formed and the partition walls 12 may be fixed on one surface of the substrate 11. Alternatively, the cell matrix 10 may be formed only by the partition walls 12. That is, the partition walls 12 may be disposed on the circuit substrate 50 without involving the substrate 11.

The electrophoretic dispersion liquid 20 is a dispersion liquid in which a plurality of electrophoretic particles 21 are dispersed in a dispersion medium 22.

For example, the electrophoretic particle 21 is a pigment particle, a resin particle, or a composite particle thereof. Examples of a pigment forming the pigment particle include a black pigment such as aniline black or carbon black and a white pigment such as titanium oxide or antimony oxide. Examples of the resin material forming the resin particle include an acrylic-based resin, a urethane-based resin, a urea resin, an epoxy-based resin, polystyrene, and polyester. Examples of the composite particle include a particle in which the surface of a pigment particle is coated with a resin material or other material, a particle in which the surface of a resin particle is coated with pigment, and a particle including a mixture in which pigment and a resin material are mixed at an appropriate composition ratio. The electrophoretic particles 21 made of the various kinds of materials are dispersed in the dispersion medium 22, for example, in a positively or negatively charged state.

The dispersion medium 22 is a hydrocarbon-based solvent with a lipophilic property and contains, for example, Isoper (registered trademark). That is, the dispersion medium 22 is a liquid containing one of Isoper E, Isoper G, Isoper H, and Isoper L, a liquid containing at least two thereof, or a liquid in which at least one thereof is mixed with another kind of hydrocarbon-based solvent.

The plurality of cells 13 of the cell matrix 10 is sealed by a sealing film 30 facing the substrate 11 with the partition walls 12 interposed therebetween. The plurality of cells 13 is sealed by closely adhering the sealing film 30 and the partition walls 12 to each other. The sealing member 30 contains PVA (for example, PVA with a saponification degree of about 80%) with an amphiphilic property, which is an example of an "amphiphilic material" according to the invention.

Next, the configuration of the phase separation portion 40, which is a feature of this embodiment, will be described with reference to FIGS. 2 and 3 in addition to FIG. 1.

Figure 2:
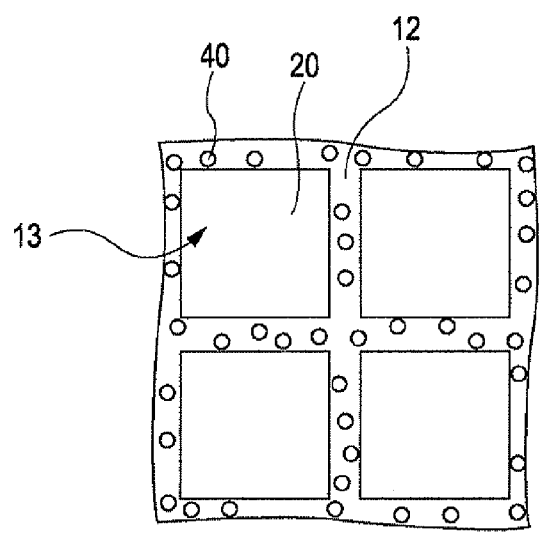
FIG. 2 is a plan view schematically illustrating an example of arrangement of a plurality of phase separation portions on the upper surfaces of partition walls.

FIG. 2 is a plan view schematically illustrating an example of the arrangement of the plurality of phase separation portions 40 on the upper surfaces of the partition walls 12. FIG. 3 is a schematic view illustrating the configuration of the phase separation portion 40.

In this embodiment, as shown in FIGS. 1 and 2, particularly, the phase separation portions 40 with, for example, a spherical shape or a disk shape are partially formed between the upper surfaces of the partition walls 12 and the sealing film 30. As for the phase separation portions 40, in the manufacturing process, the electrophoretic dispersion liquid 20 remaining on the upper surfaces of the partition walls 12 are subjected to phase separation by the amphiphilic PVA of the sealing film 30.

Figure 3:
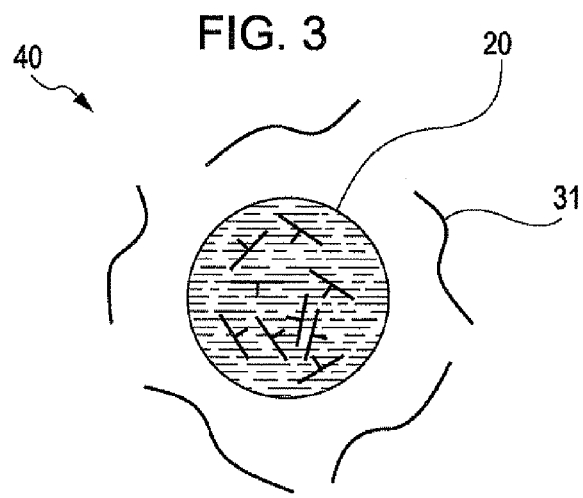
FIG. 3 is a schematic diagram illustrating the configuration of the phase separation portion according to the first embodiment.

As for the phase separation portion 40, as shown in FIG. 3, the electrophoretic dispersion liquid 20 is separated in a spherical shape or a disk shape by amphiphilic PVA 31 of the sealing film 30.

For example, the area in which the upper surface of the partition wall 12 and the sealing film 30 are closely adhered to each other can be made larger compared to a case where the electrophoretic dispersion liquid 20 subjected to no phase separation is interposed between the upper surface of the partition wall 12 and the sealing film 30. Thus, it is possible to improve adhesion of the upper surface of the partition wall 12 and the sealing film 30. Accordingly, it is possible to improve the airtight property of the plurality of cells 13. As a consequence, it is possible to improve reliability of the electrophoretic display device 1.

A ratio of the area of the phase separation portion 40 occupying the upper surface of the partition wall 12 to the area of the upper surface of the partition wall 12 is, for example, about 25% or less.

Next, a method of manufacturing the above-described electrophoretic display device 1 will be described with reference to FIGS. 4 to 8.

FIGS. 4 to 8 are sectional views illustrating the process of manufacturing the electrophoretic display device in order according to this embodiment. FIGS. 4 to 8 are illustrated in correspondence with FIG. 1.

Figure 4:
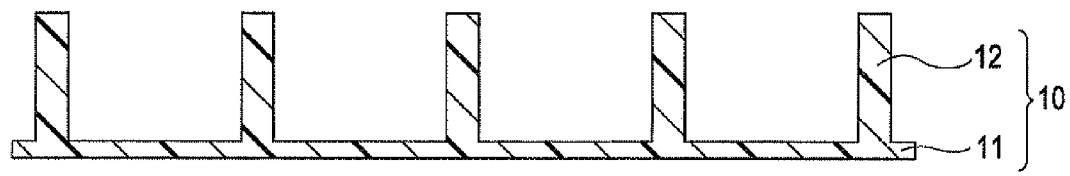
FIG. 4 is a sectional view (part 1) illustrating a process of manufacturing the electrophoretic display device in order according to the first embodiment.

As shown in FIG. 4, the cell matrix 10 including the substrate 11 and the partition walls 12 is first prepared in the method of manufacturing the electrophoretic display device according to this embodiment.

Figure 5:
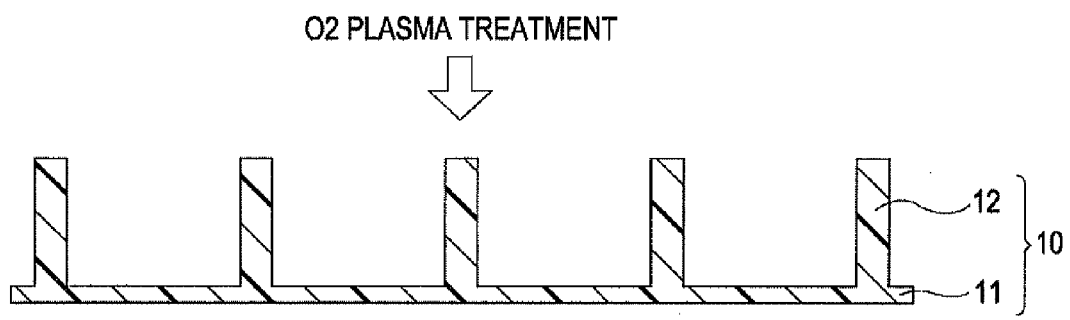
FIG. 5 is a sectional view (part 2) illustrating the process of manufacturing the electrophoretic display device in the order according to the first embodiment.

Next, as shown in FIG. 5, the cell matrix 10 (that is, the substrate 11 and the partition walls 12) is subjected to O2 plasma treatment (plasma treatment using an O2 gas). Thus, a polar group such as a carboxyl group or a carbonyl group can be formed on the upper surface of the partition wall 12. Accordingly, the upper surface of the partition wall 12 has a lyophilic property (that is, a good wetting property of both of the electrophoretic dispersion liquid 20 and a sealing liquid which is described below and is a material of the sealing film 30).

Figure 6:
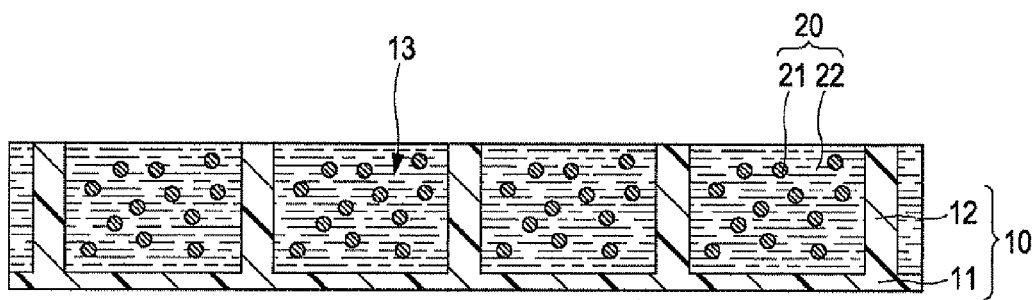
FIG. 6 is a sectional view (part 3) illustrating the process of manufacturing the electrophoretic display device in the order according to the first embodiment.

Next, as shown in FIG. 6, the plurality of cells 13 of the cell matrix 10 is filled with the electrophoretic dispersion liquid 20. As a method of filling the plurality of cells 13 with the electrophoretic dispersion liquid 20, there are various kinds of coating methods such as an instillation method using a dispenser, an ink jet method (method of ejecting a liquid droplet), a spin coating method, a dip coating method, and a spray coating method. However, among these coating methods, the instillation method or the ink jet method is preferably used. According to the instillation method or the ink jet method, the cells 13 can be filled with the electrophoretic dispersion liquid 20 without waste and reliably since the electrophoretic dispersion liquid 20 can be selectively supplied to a target region.

Figure 7:
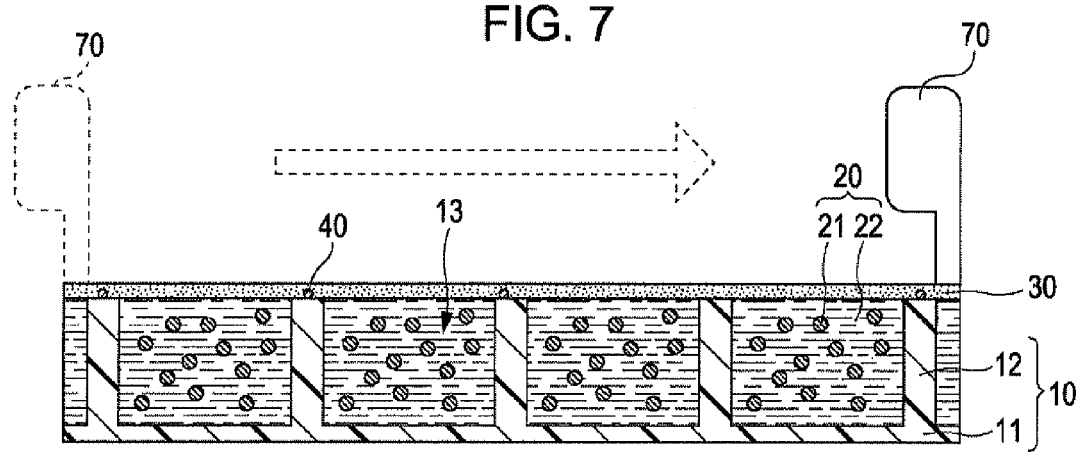
FIG. 7 is a sectional view (part 4) illustrating the process of manufacturing the electrophoretic display device in the order according to the first embodiment.

Next, as shown in FIG. 7, the sealing film 30 containing the amphiphilic PVA is prepared so as to face the substrate 11 with the partition walls 12 interposed therebetween. Specifically, the amphiphilic PVA is solved in, for example, water or a hydrophilic liquid (for example, methanol or ethanol) so that a liquid form is made. In this way, a sealing liquid is prepared. Next, the sealing liquid is applied toward the upper surface (surface opposite to the side on which the substrate 11 is installed in the partition walls 12) of the cell matrix 10 by the use of, for example, a squeegee (plate-shaped fixture) 70, and a drying process is performed for hardening to form the sealing film 30.

In this embodiment, as described above, the cell matrix 10 is subjected to the O2 plasma treatment, so that the polar group such as a carboxyl group or a carbonyl group is formed on the upper surface of the partition wall 12. Therefore, the upper surfaces of the partition walls 12 have the lyophilic property with respect to the above-described sealing liquid. When the plurality of cells 13 is filled with the electrophoretic dispersion liquid 20 and the electrophoretic dispersion liquid 20 remains on the upper surfaces of the partition walls 12, a part of the electrophoretic dispersion liquid 20 remaining on the upper surface of the partition walls 12 can be eliminated by applying the sealing liquid on the upper surface of the cell matrix 10. Further, the sealing film 30 includes the amphiphilic PVA. Therefore, when the plurality of cells 13 is filled with the electrophoretic dispersion liquid 20, the electrophoretic dispersion liquid 20 remaining on the upper surfaces of the partition walls 12 can be subjected to the phase separation. Thus, the phase separation portions 40 in which the electrophoretic dispersion liquid 20 is subjected to the phase separation can be partially formed between the upper surfaces of the partition walls 12 and the sealing film 30 (that is, in parts between the upper surfaces of the partition walls 12 and the sealing film 30).

Accordingly, the area in which the upper surface of the partition wall 12 and the sealing film 30 are closely adhered to each other can be made larger compared to the case where the electrophoretic dispersion liquid 20 subjected to no phase separation is interposed, for example, between the upper surface of the partition wall 12 and the sealing film 30. Thus, it is possible to improve the adhesion of the upper surface of the partition wall 12 and the sealing film 30.

According to this embodiment, hydrogen bonding is formed between the polar group such as a carboxyl group or a carbonyl group formed on the upper surface of the partition wall 12 and a hydroxyl group of the sealing film 30 including the amphiphilic PVA. Therefore, it is possible to further improve the adhesion of the upper surface of the partition wall 12 and the sealing film 30.

Figure 8:
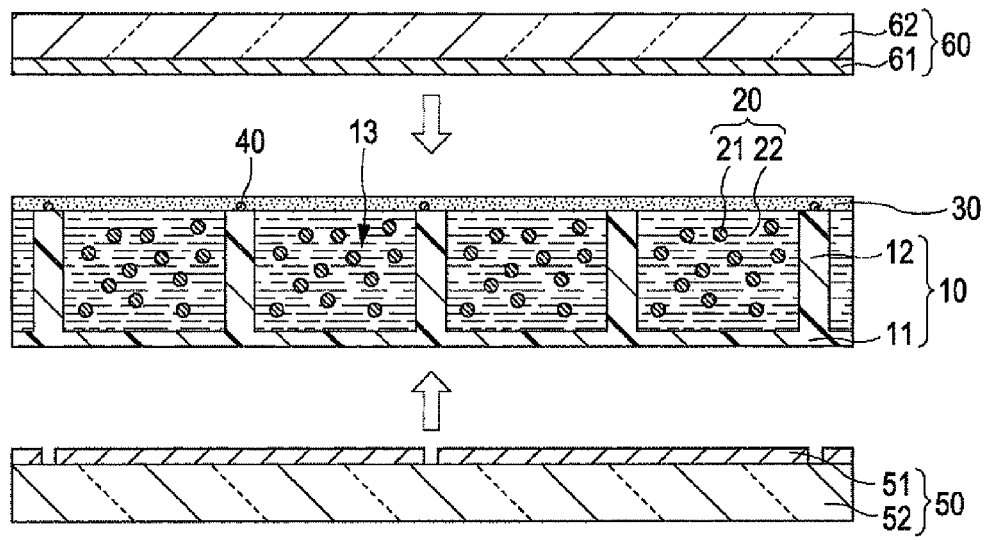
FIG. 8 is a sectional view (part 5) illustrating the process of manufacturing the electrophoretic display device in the order according to the first embodiment.

Next, as shown in FIG. 8, the circuit substrate 50 and the counter substrate 60 are mounted on the cell matrix 10. At this time, the surface of the circuit substrate 50 on the side of the pixel electrodes 51 is mounted on the surface of the substrate 11 of the cell matrix 10. Further, the surface of the counter substrate 60 on the side of the counter electrode 61 is mounted on the surface of the cell matrix 10 on which the sealing film 30 is formed. The mounting may be performed using, for example, an adhesive.

In this way, the electrophoretic display device 1 described with reference to FIGS. 1 to 3 is manufactured.

Modified Example

Instead of the O2 plasma treatment described with reference to FIG. 5, the cell matrix 10 may be subjected to CF4 plasma treatment (that is, plasma treatment using a CF4 gas). In this case, a carbon fluoride group (—CF) can be formed on the upper surface of the partition wall 12. Accordingly, since hydrogen bonding is formed between the carbon fluoride group formed on the upper surface of the partition wall 12 and the hydroxyl group of the sealing film 30, it is possible to improve the adhesion of the upper surface of the partition wall 12 and the sealing film 30 more reliably. In this case, since the partition wall 12 has a liquid-repellent property, the cells 13 can be selectively filled with the electrophoretic dispersion liquid 20 more reliably.

Alternatively, the cell matrix 10 may be subjected to the CF4 plasma treatment in addition to the O2 plasma treatment described with reference to FIG. 5. That is, before the plurality of cells 13 is filled with the electrophoretic dispersion liquid 20, the cell matrix 10 may be subjected to the O2 plasma treatment and the CF4 plasma treatment. In this case, the carboxyl group, the carbonyl group, and the carbon fluoride group can be formed on the upper surfaces of the partition walls 12. Accordingly, since hydrogen bonding can be formed between the carboxyl group, the carbonyl group, and the carbon fluoride group formed on the upper surfaces of the partition walls 12 and the hydroxyl group of the sealing film 30, it is possible to improve the adhesion of the upper surface of the partition wall 12 and the sealing film 30 more reliably. In this case, since the partition walls 12 have the liquid-repellent property, the cells 13 can be selectively filled with the electrophoretic dispersion liquid 20 more reliably.

Alternatively, instead of the O2 plasma treatment described with reference to FIG. 5, the cell matrix 10 may be subjected to UV ozone treatment. In this case, the carboxyl group or the carbonyl group can be formed on the upper surfaces of the partition walls 12. Accordingly, since hydrogen bonding can be formed between the carboxyl group or the carbonyl group formed on the upper surface of the partition wall 12 and the hydroxyl group of the sealing film 30, it is possible to improve the adhesion of the upper surface of the partition wall 12 and the sealing film 30 more reliably. In this case, for example, in comparison to the case where the O2 ozone treatment is performed, the configuration of an apparatus forming the polar group on the upper surfaces of the partition walls 12 can be simplified, thereby reducing the cost of the electrophoretic display device 1.

Second Embodiment

An electrophoretic display device according to a second embodiment will be described with reference to FIGS. 9 and 10.

Figure 9:
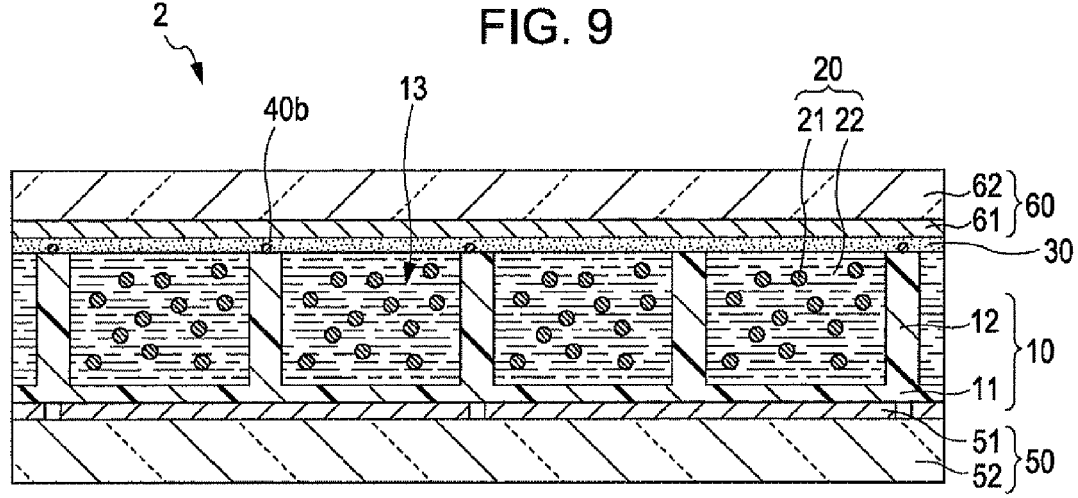
FIG. 9 is a sectional view illustrating the configuration of an electrophoretic display device according to a second embodiment.

FIG. 9 is a sectional view illustrating the configuration of the electrophoretic display device according to the second embodiment. In FIG. 9, the same reference numerals are given to the same constituent elements as those shown in FIGS. 1 to 3 according to the first embodiment and the description thereof will not be repeated.

As shown in FIG. 9, an electrophoretic display device 2 according to the second embodiment is different from the electrophoretic display device 1 described above in the first embodiment in that a surface active agent, which is an example of the "amphiphilic material", according to the invention is added to the electrophoretic dispersion liquid 20 and phase separation portions 40b are partially formed between the upper surfaces of the partition walls 12 and the sealing film 300 instead of the above-described phase separation portions 40. The other configuration is substantially the same as that of the electrophoretic display device 1 described above in the first embodiment.

In this embodiment, particularly, the surface active agent is added to the electrophoretic dispersion liquid 20 and the phase separation portions 40b with a spherical shape or a disk shape are partially formed between the upper surfaces of the partition walls 12 and the sealing film 30. As for the phase separation portions 40b, in the manufacturing process, the electrophoretic dispersion liquid 20 remaining on the upper surfaces of the partition walls 12 are subjected to phase separation by the surface active agent added to the electrophoretic dispersion liquid 20. For example, one of an anionic surface active agent, a cationic surface active agent, an amphoteric-ionic surface active agent, and a non-ionic surface active agent or a mixture of two or more thereof can be used as the surface active agent added to the electrophoretic dispersion liquid 20.

Figure 10:
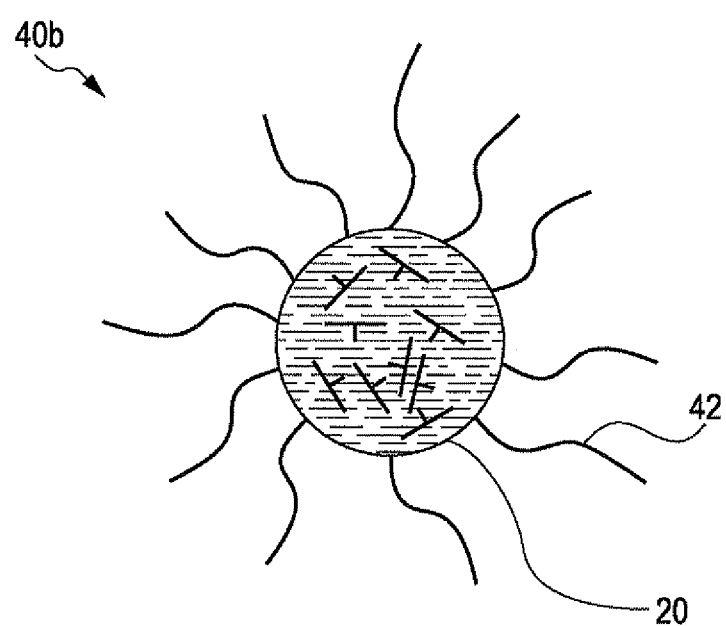
FIG. 10 is a plan view schematically illustrating the configuration of a phase separation portion according to the second embodiment.

FIG. 10 is a schematic diagram illustrating the configuration of the phase separation portion 40b.

As shown in FIG. 10, as the phase separation portion 40b, the electrophoretic dispersion liquid 20 is separated in a spherical shape or a disk shape by amphiphilic molecules 42 of the surface active agent.

Thus, since the phase separation portions 40b with, for example, a spherical shape or a disk shape are partially formed between the upper surfaces of the partition walls 12 and the sealing film 30, it is possible to improve the adhesion of the upper surface of the partition wall 12 and the sealing film 30 as in the above-described first embodiment. Accordingly, it is possible to improve the airtight property of the plurality of cells 13. As a consequence, it is possible to improve reliability of the electrophoretic display device 1.

Electronic Apparatus

Next, electronic apparatuses to which the above-described electrophoretic display device is applied will be described with reference to FIGS. 11 and 12. Hereinafter, cases will be described in which the above-described electrophoretic display device is applied to an electronic paper and an electronic note.

Figure 11:
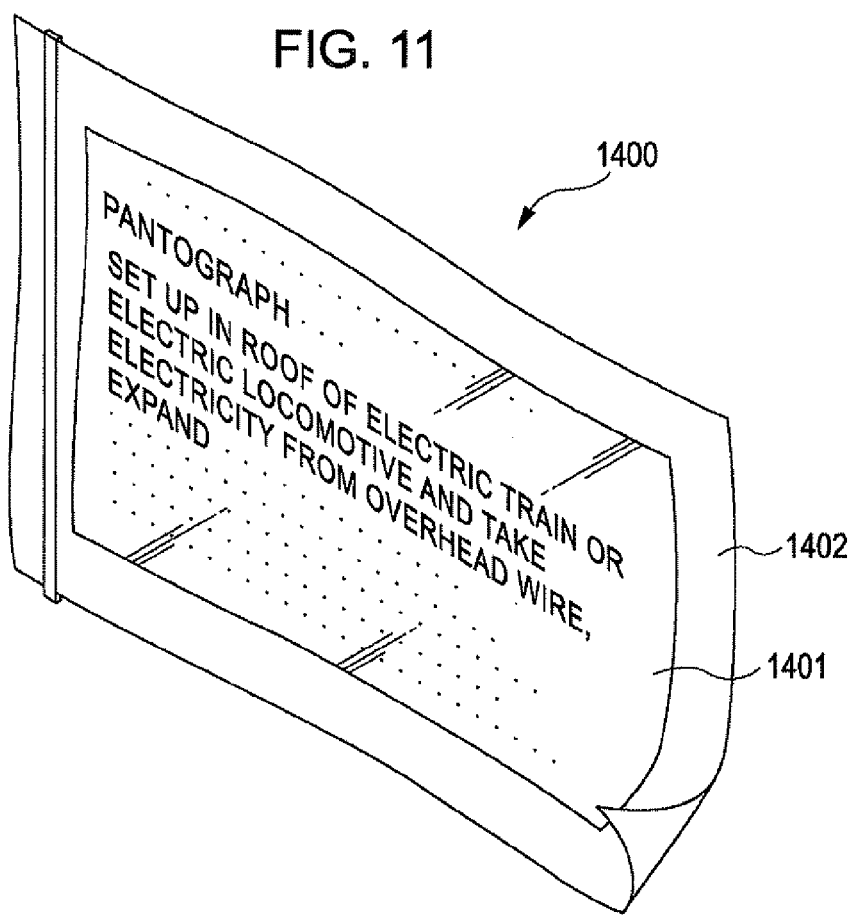
FIG. 11 is a perspective view illustrating the configuration of an electronic paper which is an example of an electronic apparatus to which the electrophoretic display device is applied.

FIG. 11 is a perspective view illustrating the configuration of an electronic paper 1400.

As shown in FIG. 11, the electronic paper 1400 includes the electrophoretic display device according to the above-described embodiments as a display unit 1401. The electronic paper 1400 has a flexible property and includes a body 1402 formed of a sheet which has the same texture and flexibility of known paper and on which rewriting can be performed.

Figure 12:
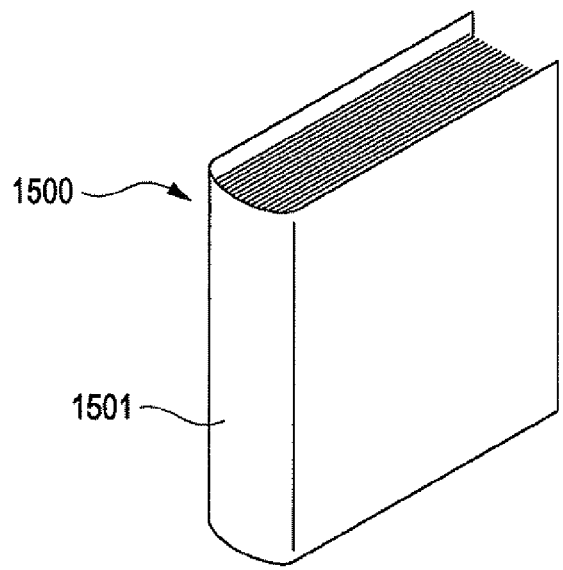
FIG. 12 is a perspective view illustrating the configuration of an electronic note which is an example of the electronic apparatus to which the electrophoretic display device is applied.

FIG. 12 is a perspective view illustrating the configuration of an electronic note 1500.

As shown in FIG. 12, the electronic note 1500 is formed by inserting the plural sheets of electronic paper 1400 shown in FIG. 11 into a cover 1501. The cover 1501 includes a display data input unit (not shown) which inputs display data transmitted from, for example, an external apparatus. Thus, display contents can be changed or updated in accordance with the display data in a state where the electronic paper is bound.

Since the electronic paper 1400 and the electronic note 1500 described above includes the electrophoretic display device described above in the embodiments, it is possible to display an image with high quality.

The invention is not limited to the above-described embodiments, but may be appropriately modified within the scope of the invention without departing from the gist or the spirit of the invention understood from the entire claims and specification. The electrophoretic display device, the method of manufacturing the electrophoretic display device, and the electronic apparatus including the electrophoretic display device are included in the technical scope of the invention.

The entire disclosure of Japanese Patent Application No. 2010-235479, filed Oct. 20, 2010 is expressly incorporated by reference herein.

What is claimed is:

1. An electrophoretic display device comprising:
    a substrate;
    partition walls which partition a space on the substrate into a plurality of cells;
    an electrophoretic dispersion liquid with which the plurality of cells on the substrate is filled;
    a sealing film which is disposed so as to face the substrate with the partition walls interposed therebetween and seals the plurality of cells; and
    phase separation portions which are partially formed between upper surfaces of the partition walls and the sealing film and in which the electrophoretic dispersion liquid is subjected to phase separation;
    wherein the sealing film partially contacts the partition walls and partially faces the partition walls through the phase separation portions.

2. The electrophoretic display device according to claim 1, wherein at least one of the electrophoretic dispersion liquid and the sealing film includes an amphiphilic material.

3. The electrophoretic display device according to claim 1, wherein the upper surfaces of the partition walls are subjected to polar surface treatment.

4. A method of manufacturing an electrophoretic display device, comprising:
    forming partition walls, which partition a space on the substrate into a plurality of cells, on a surface;
    filling the plurality of cells on the substrate with an electrophoretic dispersion liquid;
    performing polar surface treatment on upper surfaces of the partition walls; and
    preparing a sealing film, which seals the plurality of cells, so as to face the substrate with the partition walls interposed therebetween,
    wherein at least one of the electrophoretic dispersion liquid and the sealing film includes an amphiphilic material, and
    phase separation portions, in which the electrophoretic dispersion liquid is subjected to phase separation, are partially formed between upper surfaces of the partition walls and the sealing film;
    wherein the sealing film partially contacts the partition walls and partially faces the partition walls through the phase separation portions.

5. An electronic apparatus comprising:
    the electrophoretic display device according to claim 1.

* * * * *